United States Patent
Watanabe

(10) Patent No.: US 11,220,142 B2
(45) Date of Patent: Jan. 11, 2022

(54) TIRE IMBALANCE CORRECTION USING COATING METHOD

(71) Applicant: Sumitomo Rubber Industries, Ltd., Kobe (JP)

(72) Inventor: Takuma Watanabe, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 200 days.

(21) Appl. No.: 16/428,617

(22) Filed: May 31, 2019

(65) Prior Publication Data

US 2019/0375252 A1    Dec. 12, 2019

(30) Foreign Application Priority Data

Jun. 8, 2018    (JP) .............................. JP2018-110573

(51) Int. Cl.
*G01M 17/02*    (2006.01)
*B60C 19/00*    (2006.01)
(Continued)

(52) U.S. Cl.
CPC ........ *B60C 19/003* (2013.01); *B29D 30/0633* (2013.01); *F16F 15/324* (2013.01);
(Continued)

(58) Field of Classification Search
CPC ......... B60C 11/0304; B60C 2011/0346; B60C 2011/036; B60C 2011/0374; B60C 2011/0388; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004;
(Continued)

(56) References Cited

U.S. PATENT DOCUMENTS 2,193,734 A    3/1940   MacCracken
4,867,792 A *   9/1989   Ronlan .................. B60C 5/004
                                                           106/162.5
(Continued)

FOREIGN PATENT DOCUMENTS

EP    1 473 322 A1   11/2004
EP    1 759 893 A1   3/2007
(Continued)

OTHER PUBLICATIONS

Extended European Search Report dated Oct. 24, 2019, in European Patent Application No. 19176057.8.

*Primary Examiner* — Andre J Allen
(74) *Attorney, Agent, or Firm* — Birch, Stewart, Kolasch & Birch, LLP

(57) ABSTRACT

A method of correcting imbalance of a tire comprises a step of forming a coated layer on the inner surface of the tire at the point of lightest weight of the tire so as to reduce the imbalance of the tire. The coated layer has a black color substantially the same as the color of the inner surface so that it becomes difficult to recognize the correction of the weight imbalance.

13 Claims, 2 Drawing Sheets

(51) Int. Cl.
  *B29D 30/06* (2006.01)
  *F16F 15/32* (2006.01)
  *G01M 1/32* (2006.01)

(52) U.S. Cl.
  CPC ............ *G01M 1/326* (2013.01); *G01M 17/02* (2013.01); *B29D 2030/0637* (2013.01)

(58) Field of Classification Search
  CPC . B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28; G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002
  USPC .................................................. 73/146–146.8
  See application file for complete search history.

(56) References Cited

U.S. PATENT DOCUMENTS

| | | | | |
|---|---|---|---|---|
| 6,139,401 | A * | 10/2000 | Dunn | ...................... B24B 5/366 451/10 |
| 2002/0124921 | A1 | 9/2002 | Nakajima et al. | |
| 2007/0144640 | A1 * | 6/2007 | Losey | ................... B60C 19/003 152/154.1 |
| 2010/0175798 | A1 * | 7/2010 | Fogal, Sr. | ............. F16F 15/363 152/154.1 |
| 2012/0125498 | A1 * | 5/2012 | Majumdar | .............. B60C 19/00 152/154.1 |

FOREIGN PATENT DOCUMENTS

| | | | | |
|---|---|---|---|---|
| EP | 2 871 386 A1 | 5/2015 | | |
| JP | 2002-195907 A | 7/2002 | | |
| KR | 2012-0016825 A | 2/2012 | | |
| WO | WO-2010081016 A1 * | 7/2010 | ............ | F16F 15/363 |
| WO | WO-2016105410 A1 * | 6/2016 | ........... | B60C 19/122 |

* cited by examiner

TIRE IMBALANCE CORRECTION USING COATING METHOD

TECHNICAL FIELD

The present invention relates to a method of correcting imbalance of a tire and a tire whose imbalance is corrected, more partially to a black coated layer formed on the inner surface of the tire to reduce a weight imbalance of the tire.

BACKGROUND ART

Conventionally, the following method is employed in order to correct the weight imbalance of a tire-wheel assembly: firstly, using a balance measuring machine, the amount of imbalanced weight of an assembly of a tire and the position in the tire circumferential direction of the imbalanced point (point of lightest weight) are measured; and then, a weight member made of a metal material, for example, lead, brass, etc. and having a mass capable of balancing with the imbalanced weight is fixed to the rim flange of the wheel at a position corresponding to the circumferential position of the point of lightest weight.

This method does not correct the imbalance of the tire itself. Accordingly, when the wheel is replaced, it becomes necessary to correct the weight imbalance again.

SUMMARY OF THE INVENTION

Problems to be Solved by the Invention

Japanese Patent Application Publication No. 2002-195907 discloses a method of correcting the imbalance of a tire itself by bonding a weight member made of a low specific gravity material such as a sponge material onto the inner surface of the tire.

when a sponge material or the like is used as a weight member and adhered to the inner surface of the tire, there is a possibility that the weight member is partially separated from the tire during running. Further, when such tire is exhibited or hits store shelves, it is easily visible that the weight member is adhered to only a part of the inner surface, therefore, there is possibility that the tire gives buyers and consumers a bad impression in appearance. Further, since the volume of the weight member becomes relatively large due to the low specific gravity of the material, there is a possibility that the weight member gives a bad impression such that the amount of imbalance of the tire is originally very large. Thus, there is a problem such that the commercial value of the tire is lowered although the tire has no problem in the performance aspect.

Thus, it is desirable to have a correction method in which it is hard to recognize the correction of the imbalance.

It is therefore, an object of the present invention to provide a tire and a correcting method in which even if the imbalance of the tire is corrected, it is difficult to recognize the correction of the imbalance, and thus, the impression in appearance and commercial value of the tire are not deteriorated, and also the effect of correcting the imbalance can be maintained without using a sponge material which might have a possibility of partial separation.

According to one aspect of the present invention, a method of correcting imbalance of a tire comprises a step of forming a black coated layer on the inner surface of the tire at the circumferential position of the point of lightest weight of the tire so that the weight imbalance of the tire is reduced.

It is preferable that the black coated layer is formed by applying a black paint containing carbon black.

It is preferable that the black paint has a specific gravity of 1.00 to 1.10.

It is preferable that the weight of the black coated layer is in a range from 3 to 10 grams.

It is preferable that the length in the tire circumferential direction of the black coated layer is in a range from 15 to 70 degrees in terms of the angle θ around the tire rotational axis.

According to another aspect of the present invention, a tire comprises a pneumatic tire and a black coated layer on the inner surface of the pneumatic tire which is formed at the circumferential position of the point of lightest weight of the pneumatic tire so as to reduce the weight imbalance of the pneumatic tire.

In the present invention, since the black coated layer having the same black color as the inner surface of the tire is used to correct the imbalance of the tire, it is difficult to recognize the presence or absence of the correction, therefore, it is possible to prevent the impression in appearance of the tire and the commercial value from deteriorating, while maintaining the effect of the correction of the weight imbalance of the tire.

DESCRIPTION OF THE PREFERRED EMBODIMENTS

Embodiments of the present invention will now be described in detail in conjunction with accompanying drawings.

Figure 1:
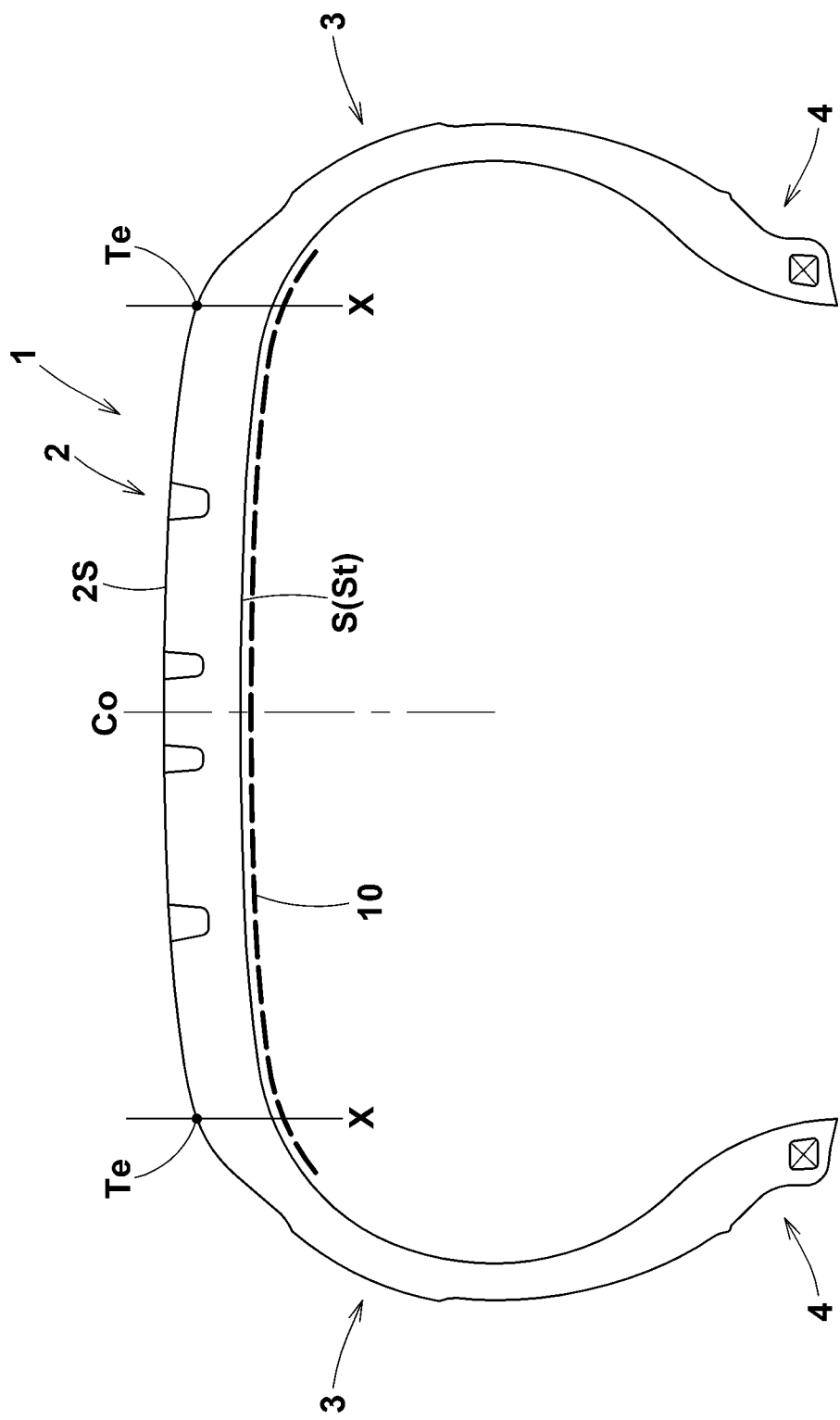
FIG. 1 is a tire-meridian cross sectional view of a tire as an embodiment of the present invention of which weight imbalance is reduced by a method of correcting the imbalance of a tire according to the present invention.
Figure 2:
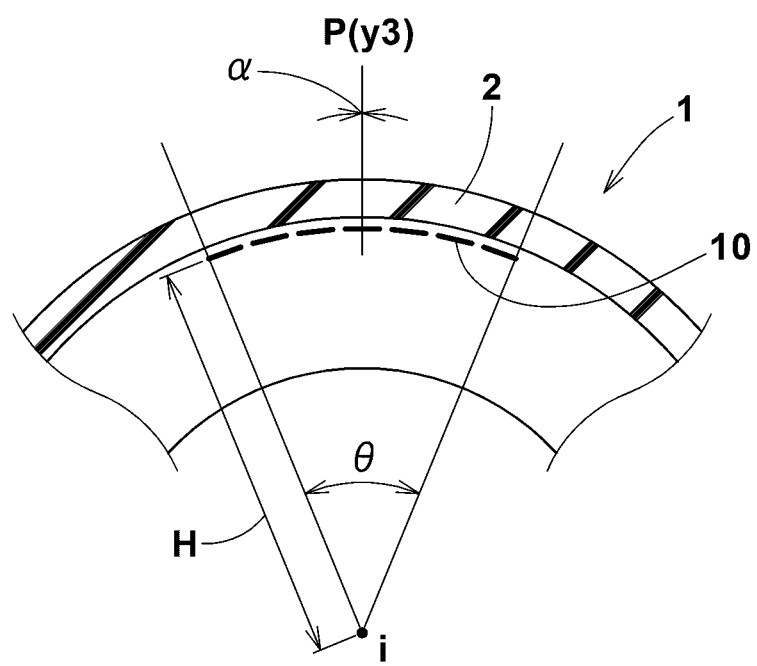
FIG. 2 is a schematic cross sectional view of the tire of FIG. 1 taken along the tire equator.

According to the present invention, as shown in FIGS. 1 and 2, the tire 1 is provided at the point P of lightest weight with a black coated layer 10 which is partially formed on the inner surface S of the tire as a balance weight so that the weight imbalance of the tire itself is reduced.

Incidentally, the point P of lightest weight of the tire can be determined by a well-known balance measuring machine.

The tire 1 is a pneumatic tire comprising a tread portion 2 having a tread surface 2S and tread edges Te, a pair of bead portions 4, and a pair of sidewall portions 3 extending radially inwardly from the tread edges Te to the bead portions 4. AS usual, the tire 1 may be reinforced by using reinforcing members, for example, a carcass, a belt layer, a band layer and bead cores.

The black coated layer 10 is formed by applying a black paint containing carbon black onto the inner surface s facing the tire cavity.

of the inner surface S of the tire, the black coated layer 10 is preferably provided on a tread inner surface St. The tread inner surface St means the inner surface of the tread portion 2, more specifically, a part of the inner surface S of the tire between two planes x passing through the respective tread edges Te in parallel with the tire equatorial plane co. By providing the black coated layer 10 in this area, the radial distance H of the black coated layer 10 from the tire rotational axis (i) becomes largest, and the effect of the black coated layer 10 to reduce the weight imbalance becomes maximum.

The entire black coated layer 10 may be disposed within the tread inner surface St. Further, the black coated layer 10 may protrude from the tread inner surface St.
In either case, it is preferable to make the black coated layer 10 symmetrical about the tire equatorial plane Co.

Incidentally, the tread edges Te are the axial outermost edges of the ground contacting patch of the tire which occurs under a normally inflated loaded condition when the camber angle of the tire is zero.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

As the black paint, a water-soluble paint comprising at least carbon black as a black pigment and aggregate, and a water solvent can be suitably employed. As the water solvent, for example, a dissolved-type water-soluble paint made from a resin dissolved in water, and an emulsion-type water-soluble paint made from a resin dispersed in water can be suitably used.

The content of the carbon black in the black paint is preferably not more than 10% by weight, more preferably not more than 7% by weight.

By drying the applied black paint, its solid components including the resin and the carbon black form the black coated layer 10 (coating film), and function as a balance weight.

The black paint may further contain known additives, e.g. a plasticizer, thickening agent and the like.

Such black paint can be applied by spraying with a spray gun, brushing or the like. However, spraying with a spray gun is more preferable from the viewpoint of the efficiency of the coating work, uniformity of the thickness of the coating, and the like.

For example, in the case of a pneumatic tire of size 225/50R20 (the radial distance from the tire rotational axis (i) to the tread inner surface Ss is about 362 mm at the tire equator), the black coated layer 10 on the tread inner surface St needs to have a weight w of about 8.5 grams in order to reduce the weight imbalance by 3.0 N cm.

On the other hand, since the black coated layer 10 has a small weight per unit area, if the formation area of the black coated layer 10 (the application area of the black paint) is increased in order to obtain the necessary weight w, then the additional weight w is not focused on the point P of lightest weight, therefore, the effect of reducing the weight imbalance becomes insufficient.

From such a point of view, as shown in FIG. 2, the length in the tire circumferential direction of the black coated layer 10 is preferably set in a range from 15 to 70 degrees in terms of the angle θ around the tire rotational axis (i). It is preferable that the angle α formed between the bisector y3 of the angle θ and a straight line passing through the point P of lightest weight and rotational axis (i) is not more than 15 degrees, more preferably not more than 10 degrees.
In this example shown in FIG. 2, the angle α is zero. In other words, in the tire circumferential direction, the black coated layer 10 is centered on the point P of lightest weight.

It is possible to obtain the necessary additional weight w by increasing the thickness of the black coated layer 10 by thickly applying the black paint, while keeping the angle θ range not more than 15 degrees.
In this case however, the applied paint tends to become lumpy, and after drying, the black coated layer 10 tends to become easily peeled off.
From the same aspect, the specific gravity of the black paint is preferably in a range from 1.00 to 1.10.
when the specific gravity is less than 1.00, the weight per unit area of the black coated layer 10 is reduced, and the obtainable additional weight w becomes small. Thus, the reduction of the weight imbalance is excessively decreased.
on the other hand, when the specific gravity exceeds 1.10, the applied paint tends to become lumpy, and after drying, the black coated layer 10 tends to become easily peeled off.

It is desirable to limit the weight of the black coated layer 10 in a range from 3 to 10 grams. If less than 3 grams, the reduction of the weight imbalance becomes too small. If the weight exceeds 10 grams, there is a possibility that tire uniformity such as RFV (radial force variation) may be adversely affected.

In the present invention, even if the black coated layer 10 is formed, since the thickness is small and the color is substantially the same as the inner surface S of the tire, it is hard to recognize the presence of the black coated layer 10. Therefore, it is possible to avoid the deterioration of the impression in appearance and the degradation of the commercial value of the tire while maintaining the effect of correcting the weight imbalance.

while detailed description has been made of an especially preferable embodiment of the present invention, the present invention can be embodied in various forms without being limited to the illustrated embodiment.

EXAMPLES

Using pneumatic tires of size 225/50R20 (rim size 20×8.0J) having the substantially same weight imbalance, test tires were prepared by applying a black paint and a sponge material. Specifications of the test tires are shown in Table 1. The test tires Ex1-Ex7 were each provided with the black coated layer by applying the black paint to the inner surface of the tread portion at the point of lightest weight. The test tire Ref was provided with a weight member made from a sponge material and applied to the inner surface of the tread portion at the point of lightest weight. The specific gravity of the sponge material was 0.16.

The test tires were measured for the amount of reduction of the weight imbalance by the black coated layers and weight member and tested for the influence of the black coated layer on the radial force variation (uv) and the durability of the black coated layer.

(1) Amount of Reduction of Weight Imbalance:
The difference in the amount of weight imbalance before and after the formation of the black coated layer was measured using a uniformity test machine. The results are indicated in Table 1, wherein the larger the number, the greater the reduction of the weight imbalance.
(2) Influence on RFV:
using the uniformity test machine, the test tires were measured for RFV under a tire pressure of 200 kPa and a vertical tire load of 6835 N in accordance with JASO C607 (Test method for uniformity of automobile tire). And the difference of RFV before and behind formation of the black coated layer was obtained. The results are indicated in Table 1. when the difference was 3.0 N or less, it was judged to have no influence on RFV.
(3) Durability of Black Coated Layer:
(3.1) Influence of Temperature Change:
After the test tire having the black coated layer was stored under a high temperature condition (80 degrees C.) for 8 days and then a low temperature condition (−30 degrees) for 3 days, the influence on the inner appearance of the tire such as discoloration, cracks, etc. of the black coated layer was visually checked. The results are indicated in Table 1.
(3.2) Recurrence of Weight Imbalance after Running:
The test tire having the black coated layer was mounted on a vehicle and continuously run for 30,000 km at a speed of 100 km (tire pressure 200 kPa), and then, the difference in the weight imbalance before and after the running was obtained.
The results are indicated in Table 1. When the difference was less than 1.0 N cm, it was judged to have no effect.
(3.3) Peeling of Black Coated Layer:
After the above-mentioned running for 30,000 km, the presence or absence of peeling of the black coated layer was visually checked. The results are indicated in Table 1.

TABLE 1

| Tire | Ref | Ex1 | Ex2 | Ex3 | Ex4 | Ex5 | Ex6 | Ex7 |
|---|---|---|---|---|---|---|---|---|
| black coated layer | absent (sponge) | | | | present | | | |
| weight (g) | — | 3 | 8 | 8 | 8 | 10 | 8 | 11 |
| angle θ (deg) | 50 | 50 | 15 | 50 | 70 | 50 | 12 | 50 |
| reduction of weight imbalance (N · cm) | 1.3 | 1.5 | 3.3 | 3.0 | 2.8 | 3.6 | 3.4 | 3.1 |
| Influence on RFV | no | no | no | no | no | no | no | yes |
| Durability of black coated layer | | | | | | | | |
| Influence of temperature change | no | no | no | no | no | no | no | no |
| Recurrence of weight imbalance after running | — | no | no | no | no | no | no | no |
| Peeling of black coated layer | — | no | no | no | no | no | yes | no |

As shown in Table 1, it was confirmed that, according to the present invention, the black coated layer can correct the weight imbalance of the tire although it is hardly recognizable because of a relatively small thickness and the substantially same color as the tire inner surface S.

DESCRIPTION OF THE REFERENCE SIGNS

1 tire
10 black coated layer
P point of lightest weight
S tire inner surface
The invention claimed is:
1. A method of correcting imbalance of a tire comprising:
a step of forming a black coated layer on a part of an inner surface of the tire including a point of lightest weight of the tire so as to reduce the imbalance of the tire, wherein
the black coated layer is formed by applying a black paint, and
the black paint is a dissolved-type water-soluble paint containing carbon black or alternatively an emulsion-type water-soluble paint containing carbon black.
2. The method according to claim 1, wherein
the black paint has a specific gravity of 1.00 to 1.10.
3. The method according to claim 1, wherein
a weight of the black coated layer is in a range from 3 to 10 grams.
4. The method according to claim 2, wherein
a weight of the black coated layer is in a range from 3 to 10 grams.
5. The method according to claim 1, wherein
a length in a tire circumferential direction of the black coated layer is in a range from 15 to 70 degrees in terms of an angle around a tire rotational axis.
6. The method according to claim 2, wherein
a length in a tire circumferential direction of the black coated layer is in a range from 15 to 70 degrees in terms of an angle around a tire rotational axis.
7. The method according to claim 3, wherein
a length in a tire circumferential direction of the black coated layer is in a range from 15 to 70 degrees in terms of an angle around a tire rotational axis.
8. The method according to claim 4, wherein
a length in a tire circumferential direction of the black coated layer is in a range from 15 to 70 degrees in terms of an angle around a tire rotational axis.
9. The method according to claim 1, wherein
the black paint is applied by spraying.
10. The method according to claim 1, wherein
the black paint is applied by brushing.
11. The method according to claim 1, wherein
a content of the carbon black in the black paint is not more than 10% by weight.
12. The method according to claim 2, wherein
a content of the carbon black in the black paint is not more than 10% by weight.
13. The method according to claim 1, wherein
a content of the carbon black in the black paint is not more than 10% by weight,
the black paint has a specific gravity of 1.00 to 1.10,
the black paint is applied by spraying or brushing, and
a length in a tire circumferential direction of the black coated layer is in a range from 15 to 70 degrees in terms of an angle around a tire rotational axis.

* * * * *